US005650603A

United States Patent [19]
Pfaff et al.

[11] Patent Number: 5,650,603
[45] Date of Patent: Jul. 22, 1997

[54] EARTHING SWITCH FOR METAL-CLAD HIGH-VOLTAGE SWITCH GEAR INSULATED WITH COMPRESSED GAS

[75] Inventors: Dietrich Pfaff, Karlsruhe; Regina Schmidt; Christian Pircher, both of Berlin, all of Germany

[73] Assignee: Siemens Aktiengesellschaft, Munich, Germany

[21] Appl. No.: 723,850

[22] Filed: Sep. 30, 1996

Related U.S. Application Data

[63] Continuation of Ser. No. 313,087, filed as PCT/DE93/00189, Feb. 26, 1993, published as WO93/20606, Oct. 14, 1993, abandoned.

[30] Foreign Application Priority Data

Mar. 31, 1992 [DE] Germany ............... 42 11 157.9

[51] Int. Cl.$^6$ ........................................ H01H 33/04
[52] U.S. Cl. ........................................ 218/79; 218/55
[58] Field of Search ...................... 218/1, 8, 12, 43, 218/45, 55, 67, 68, 79, 80, 100

[56] References Cited

U.S. PATENT DOCUMENTS

| 4,027,126 | 5/1977 | Grünert ............... 200/148 B |
| 4,413,166 | 11/1983 | Meyer ................. 200/148 |
| 4,486,634 | 12/1984 | Nakano et al. ........ 200/148 R |
| 5,382,765 | 1/1995 | Lorenz et al. ........ 200/148 R |

FOREIGN PATENT DOCUMENTS

| 0 100 510 | 2/1984 | European Pat. Off. ....... H01H 31/00 |
| 0 075 922 | 2/1989 | European Pat. Off. ....... H01H 9/20 |
| 0468300 | 1/1992 | European Pat. Off. ....... H02B 13/35 |
| 89 15 427 | 8/1990 | Germany ................. H02B 13/75 |

*Primary Examiner*—Michael L. Gellner
*Assistant Examiner*—Michael A. Friedhofer
*Attorney, Agent, or Firm*—Kenyon & Kenyon

[57] ABSTRACT

An earthing switch may be used for a metal-clad, high-voltage switchgear insulated with compressed gas. The mobile earthing contact is arranged so as to be insulated from the earthed cladding for measuring purposes. The insulation arrangement of the earthing contact is bypassed by an electrical connection, preferably outside of the cladding to earth the switching device. The electrical connection is disconnected when the earthing contact is connected in the closed position to a measuring device. An additional contact arrangement is provided that electrically bypasses the insulation arrangement and connects the mobile earthing contact to the earthed cladding when the switch is between the closed and open positions. This prevents surges resulting from pre-arcing on the insulation arrangement and possible damage to measuring instruments that may be connected to the earthing switches.

3 Claims, 2 Drawing Sheets

5,650,603

1

EARTHING SWITCH FOR METAL-CLAD HIGH-VOLTAGE SWITCH GEAR INSULATED WITH COMPRESSED GAS

This is a continuation of application Ser. No. 08/313,087 filed as PCT/DE93/00189, Feb. 26, 1993, published as WO93/20606, Oct. 14, 1993, now abandoned.

BACKGROUND OF THE INVENTION

The present invention provides an earthing switch for a metal-clad, high-voltage switchgear insulated with compressed gas having a mobile earthing contact, which is arranged so as to be insulated from the earthed cladding, and provides an electrical connection that bypasses the insulation arrangement of the earthing contact to prevent pre-arcing and voltage surges.

Earthing switches of this kind, as disclosed, for example, by the European Patent Document No. EP-A 0 075 922, are used not only to transfer the earth potential to the conductor of the switchgear carrying the high voltage, but also for measuring purposes during normal operation, in particular when electric energy is not being transferred. The electrical connection that bypasses the insulation arrangement of the earthing contact must be open in order to conduct measurements.

The earthing switch is jeopardized by pre-arcing to the mobile earthing contact in the area of the insulation arrangement when the earthing switch is moved to the closed position. In the course of the closing movement, charges of considerable voltages can still be present on the conductor of the assembly, which could abruptly lead to an arc-over shortly before the earthing contact comes in galvanic contact with the conductor. Such a sparkover causes transient surges, which can overload the insulation arrangement, which is typically rated for voltages of only a few kV.

U.S. Pat. No. 4,413,166 discloses a disconnect switch, whereby one of the pair of electrodes that is separated from the other is forced to make galvanic contact with the earth potential when it is in the open position.

European Patent Document No. EP-A-0 100 510 discloses an earthing switch that establishes an earthing contact by way of a resistor. No provision is made therein for a temporary direct grounding of one electrode of the earthing switch to protect from transient surges.

SUMMARY OF THE INVENTION

The present invention reliably avoids surges resulting from discharges on the insulation arrangement and possible damage to measuring instruments connected thereto.

This is accomplished in the present invention, which provides an additional contact arrangement that is forced to electrically bypass the insulation arrangement and connect the mobile earthing contact to the earthed cladding when the switch is between the closed and open positions.

The present invention ensures that starting with an open electrical connection, the insulation arrangement and a measuring device connected to the earthing contact are automatically protected from a pre-arcing as the earthing contact is closed.

A preferred embodiment of the present invention provides a mobile earthing contact comprising a blade switching contact arranged on a rotatably driven shaft, which is capable of being connected to a sliding-action contact strip electrically connected to the cladding arranged concentrically around the shaft via a spring contact that is movable at right angles to the shaft.

2

Another advantageous embodiment of the present invention provides for the mobile earthing contact to be a movable contact pin, which has a straight line displacement and is connectible to a sliding-action contact surface of the cladding running parallel to the axis, via a spring contact supported at right angles to the contact pin.

DETAILED DESCRIPTION

Figure 1:
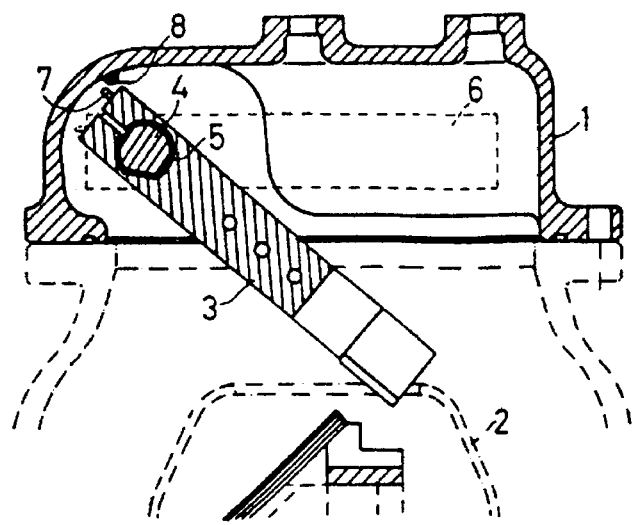
FIG. 1 is a schematic cross section of the first preferred embodiment of the earthing switch in its first or open position.

Two preferred embodiments of an earthing switch for a metal-clad, high-voltage switchgear insulated with compressed gas are described in the drawings.

Figure 2:
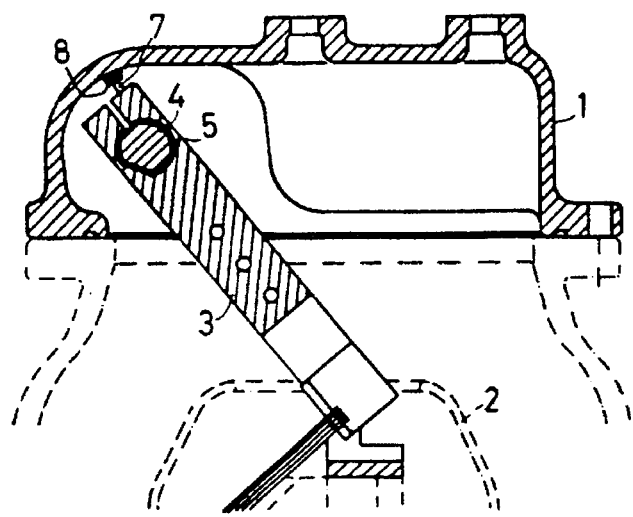
FIG. 2 is a schematic cross section of the first preferred embodiment of the earthing switch in its intermediate position.
Figure 3:
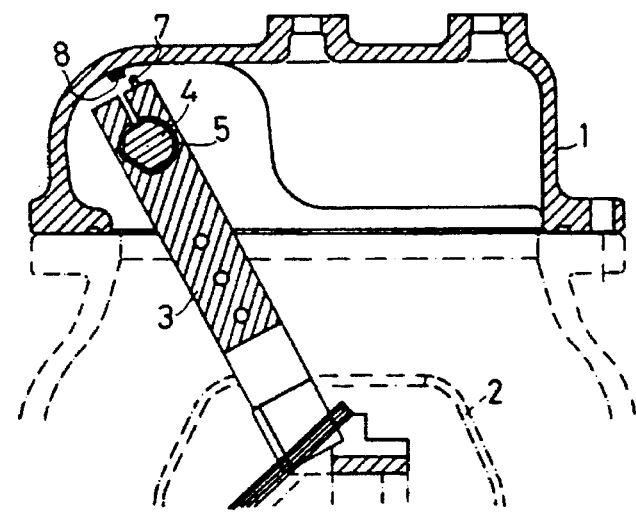
FIG. 3 is a schematic cross section of the first preferred embodiment of the earthing switch in its second or closed position.

In cross-section, FIGS. 1 through 3 schematically depict the first preferred embodiment in three different positions between the closed and open position during the sequence of motion of the mobile earthing contact.

In FIG. 1, a conductor 2 carrying a high voltage is provided inside a metal cladding 1. Conductor 2 is moved into a galvanic connection with an earthing contact designed as a blade contact 3. For this purpose, the blade contact 3 is seated in a torsionally rigid on a drive shaft 4, which is to be set in rotary motion by a drive (not shown) situated outside of the earthed cladding 1.

The bearing 5 supporting the shaft 4 is provided with an insulation arrangement rated for voltages of a few kV, which is able to be by-passed outside of the cladding 1 by a flexible conductor or the like that connects this cladding to the shaft 4. In the course of the closing movement, the blade contact moves out of the position 6 (the open position, drawn with a dotted line) into the position shown, in which a spring-loaded pin 7 of an additional contact arrangement has not yet made contact with a sliding-action contact strip 8.

When the earthing switch is moved further into the closed position, the blade contact 3 arrives in the position apparent from FIG. 2, in which the pin 7 makes contact with the sliding-action contact strip 8 and, consequently, is compelled to transfer the earth potential of the cladding 1 to the blade contact 3. As a result, the blade contact 3 is grounded to withstand the external electrical connection between the shaft 4 and the cladding 1, whereby surges are kept away from the insulation arrangement of bearing 5.

When the earthing switch is moved further into the closed position, as shown in FIG. 3, the blade contact 3 comes into galvanic contact with the conductor 2. Here, pin 7 is disengaged from the sliding-action contact strip 8.

Figure 4:
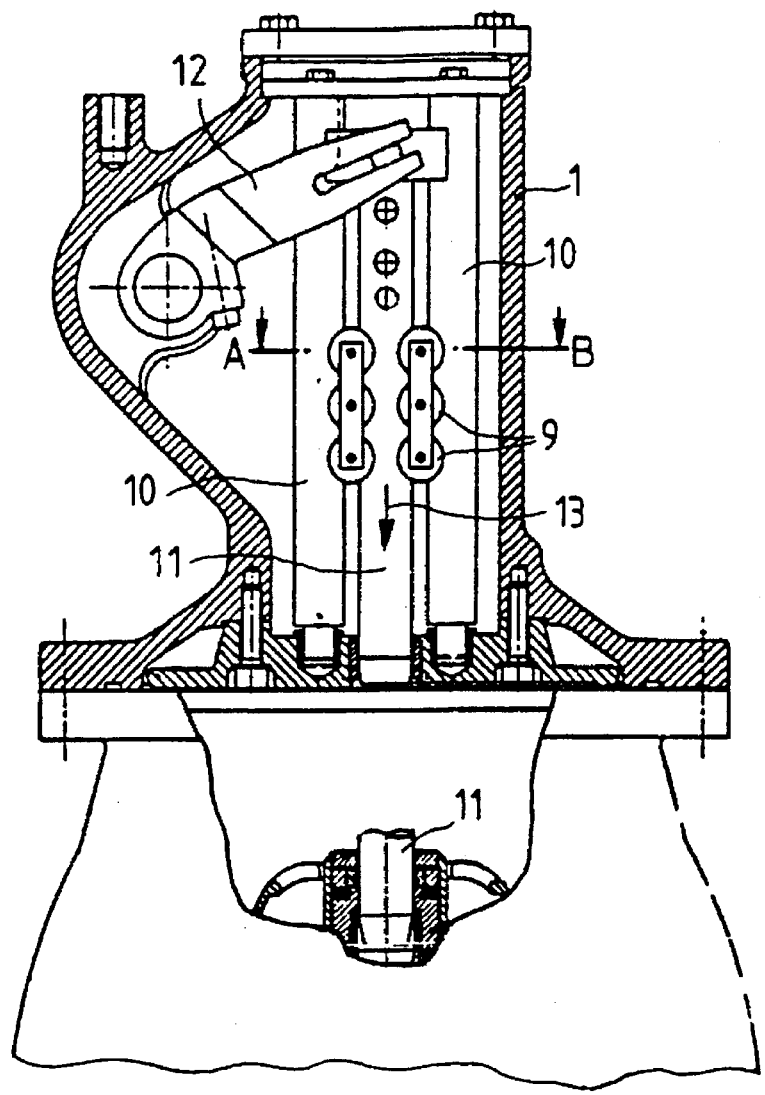
FIG. 4 is a schematic cross section of the second preferred embodiment of the earthing switch.
Figure 5:
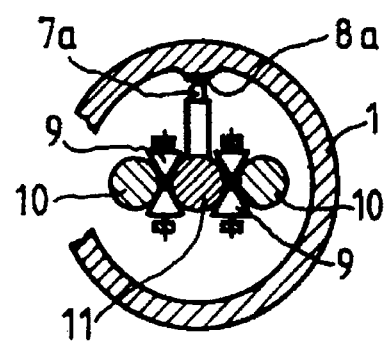
FIG. 5 is a schematic cross section of the second preferred embodiment taken along line of intersection A-B of FIG. 4.

In a partially cut-away view and in a corresponding cross-section, FIGS. 4 and 5 illustrate another preferred embodiment of an earthing switch according to the invention, whereby the same parts are given the same reference symbols as in FIGS. 1 through 3.

The earthing contact is a contact pin 11, which is can be displaced in a straight line by means of contact rollers 9 and bar guides 10 and is operable by a roller-lever actuator 12. Here, FIG. 4 shows the open position. In the course of the switching motion in the direction of the arrow 13, as the line of intersection A-B shows in FIGS. 5, a pin 7a, which is guided with spring action at right angles to the contact pin 11, is pressed against a sliding-action contact surface 8a, whereby the earth potential of the cladding 1 is compulsorily transferred to the contact pin 11. In the closed and open position, the pin 7a does not contact the sliding-action contact surface 8a so that the earthing switch in these positions can be used for measuring purposes.

What is claimed is:

1. An earthing switch for a metal-clad, high-voltage switchgear insulated with compressed gas comprising:

a metal cladding a stationary conductor;

a mobile earthing contact arranged so as to be insulated from the metal cladding by an insulation arrangement, the metal cladding being an earthed cladding, the mobile earthing contact including an additional contact arrangement that is forced to electrically bypass the insulation arrangement and which electrically, connects the mobile earthing contact to the earthed cladding when the mobile earthing contact is at an intermediate position between first and second positions, wherein at the first position the mobile earthing contact is electrically isolated from the metal cladding and from the stationary conductor and wherein at the second position the mobile earthing contact is electrically isolated from the metal cladding and is in electrical contact with the stationary conductor.

2. The earthing switch according to claim 1, wherein the mobile earthing contact is a blade switching contact arranged on a rotatably driven shaft, said additional contact arrangement including a flexible pin connected to said blade switching contact and being movable relative to the blade switching contact at right angles to said shaft, and wherein the metal cladding includes a contact surface arranged on an inner surface of the metal cladding, and wherein the flexible pin of the blade switch contact makes electrical contact with the contact surface of the metal cladding when the blade switching contact is in the intermediate position.

3. The earthing switch according to claim 1, wherein the mobile earthing contact is a movable contact pin that has a straight line displacement, said additional contact arrangement including a sliding-action contact surface electrically connected to the metal cladding running parallel to an axis of the metal cladding and a flexible pin movably supported at right angles and conductively connected to said movable contact pin.

* * * * *